United States Patent [19]

Watson et al.

[11] 4,359,608

[45] Nov. 16, 1982

[54] ADAPTIVE SAMPLER

[75] Inventors: Bobby L. Watson, Idaho Falls, Id.; Ian Aeby, Fremont, Calif.

[73] Assignee: The United States of America as represented by the United States Department of Energy, Washington, D.C.

[21] Appl. No.: 181,535

[22] Filed: Aug. 26, 1980

[51] Int. Cl.³ .............................................. H04J 6/02
[52] U.S. Cl. ............................................ 179/15.55 R
[58] Field of Search ................. 179/15.55 R, 15.55 T, 179/1 SM; 364/8, 9, 724; 375/30, 31; 358/133, 260, 261

[56] References Cited

U.S. PATENT DOCUMENTS

| | | | |
|---|---|---|---|
| 2,920,143 | 4/1960 | Filipowski | 179/15 |
| 3,006,991 | 10/1961 | Cherry et al. | 178/6 |
| 3,215,773 | 11/1965 | Chatten et al. | 178/6.8 |
| 3,299,204 | 1/1967 | Cherry et al. | 178/6 |
| 3,383,461 | 5/1968 | Malling | 178/6 |
| 4,142,071 | 2/1979 | Croisier et al. | 179/15.55 R |
| 4,216,354 | 8/1980 | Esteban et al. | 179/15.55 R |

OTHER PUBLICATIONS

C. Kortman, "Redundancy Reduction–", Proc. IEEE, Mar. 1967, pp. 253-262.

*Primary Examiner*—Emmanuel S. Kemeny

[57] ABSTRACT

An adaptive data compression device for compressing data having variable frequency content, including a plurality of digital filters for analyzing the content of the data over a plurality of frequency regions, a memory, and a control logic circuit for generating a variable rate memory clock corresponding to the analyzed frequency content of the data in the frequency region and for clocking the data into the memory in response to the variable rate memory clock.

2 Claims, 9 Drawing Figures

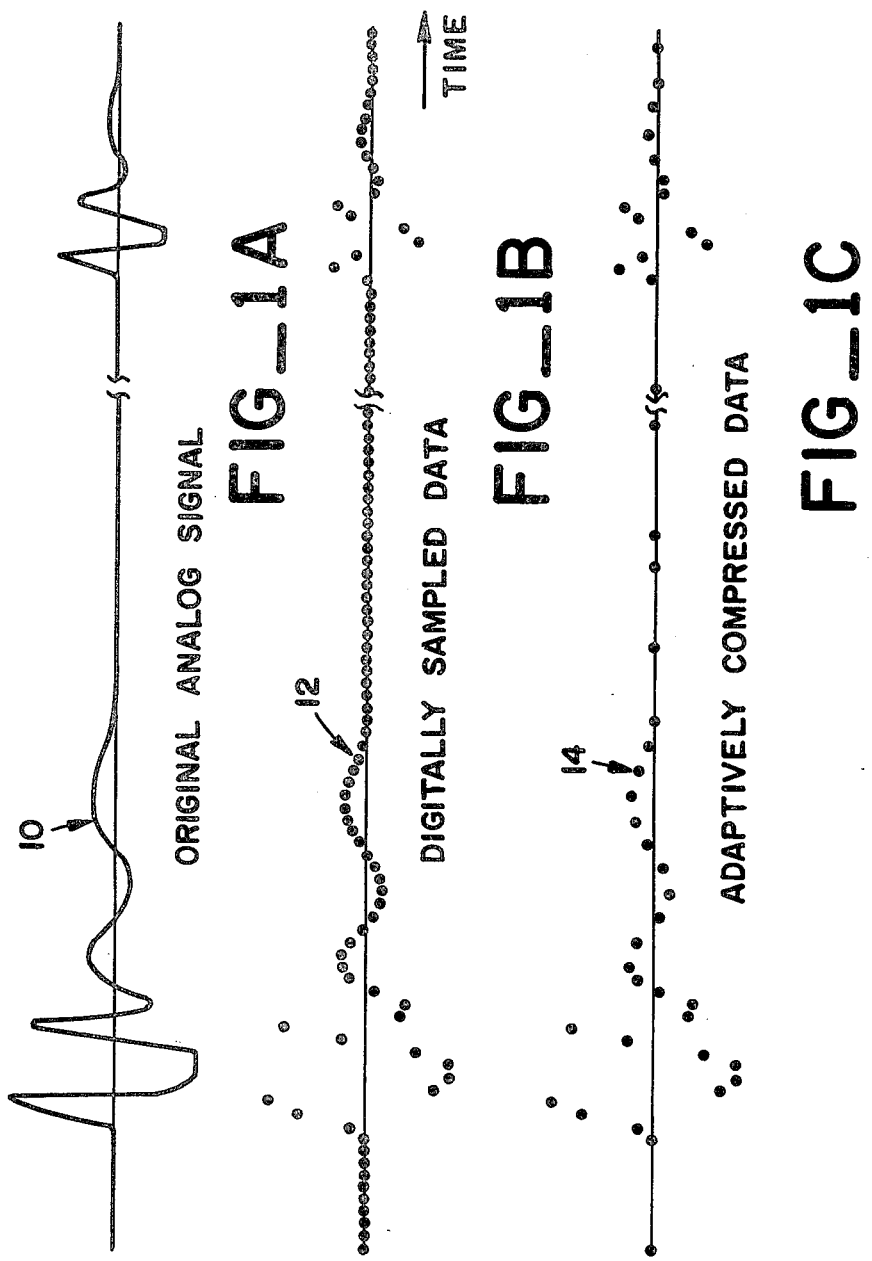

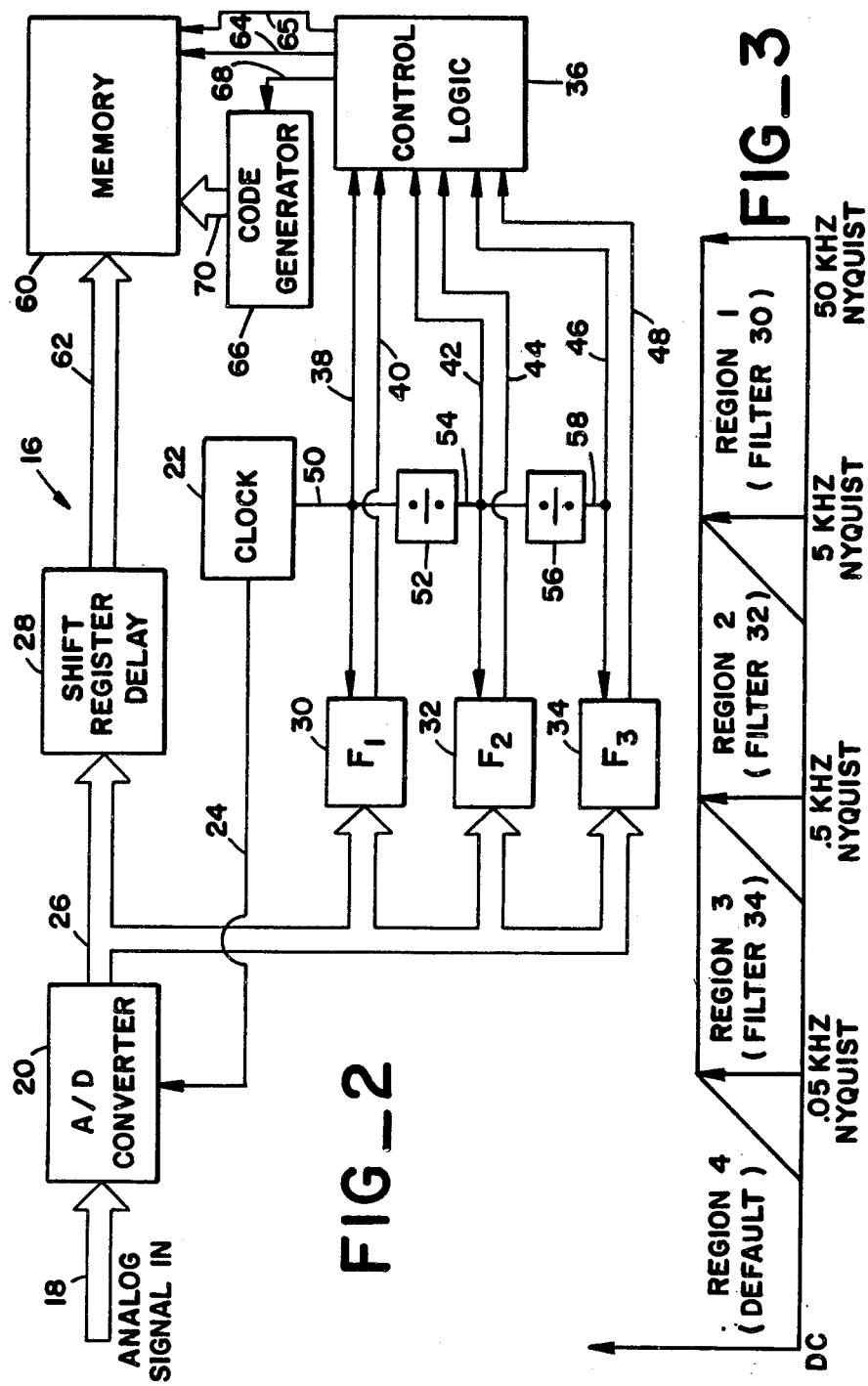

| DECISION INPUTS | | | ENCODED DECISION DATA OUTPUT | |
|---|---|---|---|---|
| $D_1$ | $D_2$ | $D_3$ | ED1 | ED0 |
| 1 | X | X | 1 | 1 |
| 0 | 1 | X | 1 | 0 |
| 0 | 0 | 1 | 0 | 1 |
| 0 | 0 | 0 | 0 | 0 |
| 1 = TRUE   0 = NOT TRUE   X = DON'T CARE | | | | |

FIG_5

| MUX ADDRESS | | INPUT CHANNEL SELECTED |
|---|---|---|
| MA1 | MA0 | |
| 0 | 0 | DATA (IC0) |
| 0 | 1 | UNIQUE CODE WORD (IC1)   (IC2) |
| 1 | 0 | CHANGE TIMING DATA HIGH (12 MSB's) |
| 1 | 1 | CHANGE TIMING DATA LOW (10 LSB's) + 2 BIT ENCODED CLOCK DATA (IC3) |

FIG_6

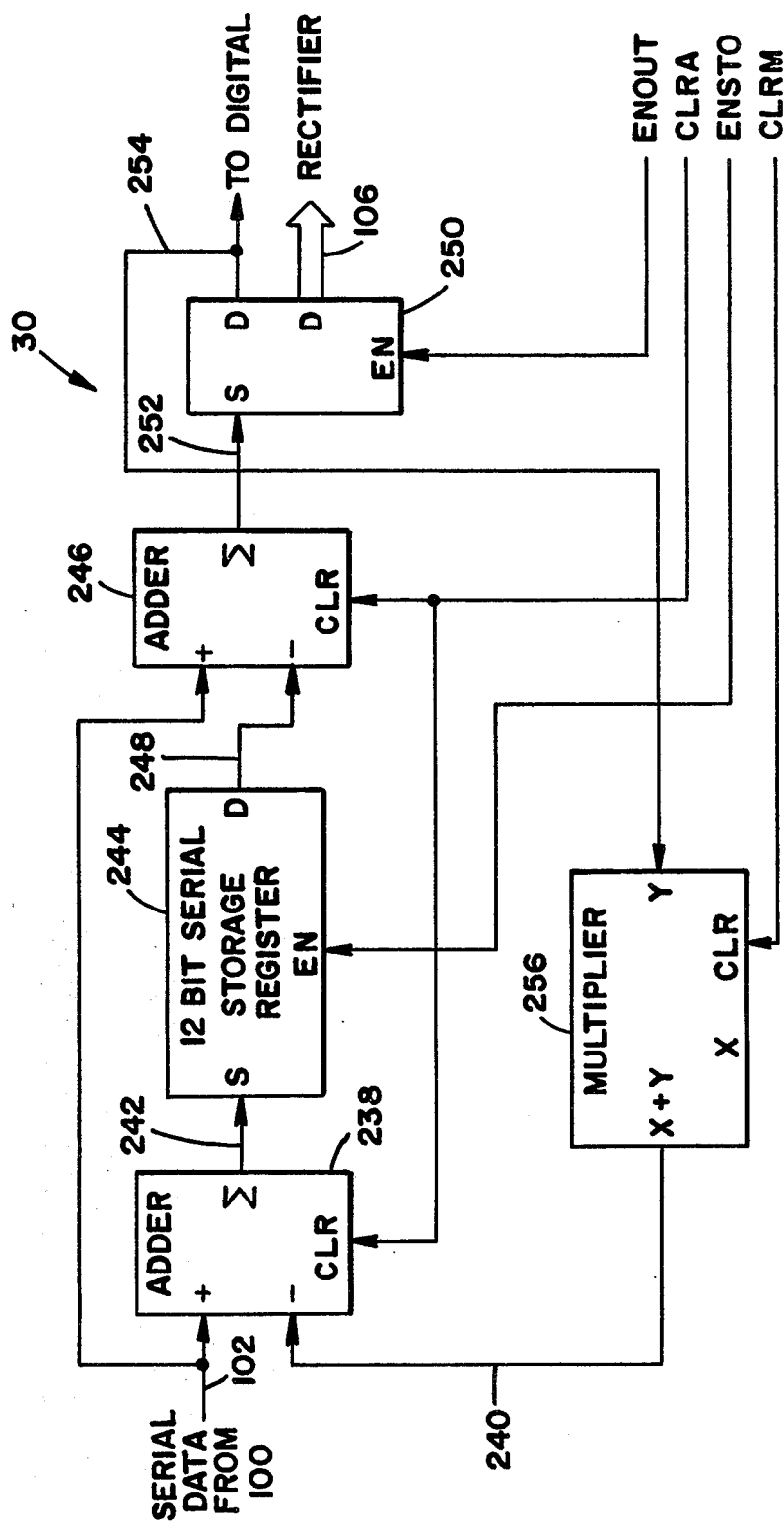
FIG_7

ADAPTIVE SAMPLER

The United States Government has rights in this invention pursuant to Contract No. EY-76-C-08-1183 between the U.S. Department of Energy and EG+G, Inc.

BACKGROUND OF THE INVENTION

The present invention relates generally to apparatus for processing an input signal and more particularly to apparatus for compressing the input signal for storage or transmission purposes.

Apparatus for compressing a signal, known as data compression devices, are used to reduce the data storage or the transmission bandwidth requirements of a system. Essentially, the data compression device takes advantage of redundancies in an original data input signal by storing or transmitting only certain samples, i.e., non-redundant information, of the signal. The non-redundant information is the information that is required for reconstructing the original signal without any substantial loss of information.

Prior data compression devices can be classified into two types, one using an amplitude threshold technique and the other using a slope threshold technique. In the amplitude threshold technique, the data compression device analyzes the amplitude of the input signal to determine the sampling rate for this signal. If the amplitude is above the threshold, the data compression device decides that this is non-redundant information and a sample is stored or transmitted. If the amplitude is below the threshold, the signal is considered to be redundant and no sample is stored or transmitted.

Similarly, data compression devices based on the slope threshold technique analyze the input signal for changes in amplitude to determine sampling rate. If the rate of change is above a threshold, the data compression device decides that the signal is non-redundant and a sample is stored or transmitted. If the rate of change is below the threshold, then the signal is considered to be redundant and no sample is stored or transmitted.

Both the prior amplitude and slope threshold data compression devices perform a relatively simple analysis of the content of the input signal for data compression purposes. That is, these devices look for only the amplitude or changes in amplitude of the input signal. This analysis limits the amount of data compression that can be achieved for a given input signal, thereby undesirably increasing the data storage or transmission bandwidth requirements.

Furthermore, in prior data compression devices, typically the circuits which determine the sampling rate of the signal constitute analog components. One problem is that voltage drifts or temperature drifts of the analog components can affect the sampling rate. For example, if there is a voltage drift, a differentiating circuit used in a slope threshold technique may not detect small changes in amplitude of the input signal. Consequently, this portion of the input signal may be non-redundant information, yet the signal may not be sampled and this non-redundant information will not be stored or transmitted for reconstruction purposes.

BRIEF SUMMARY OF THE INVENTION

It is an object of the present invention to provide a novel data compression apparatus.

Another object of the present invention is to provide a data compression apparatus which makes a more comprehensive analysis of an input signal to increase data compression.

Still another object of the present invention is to provide a data compression apparatus which determines the presence of non-redundant information more accurately than prior analog devices.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the apparatus of this invention may comprise means for analyzing the frequency content of an input signal, means for effectively sampling the input signal at a rate which is a function of the frequency content of the input signal to reconstruct the input signal and means for storing the effectively sampled input signal.

Preferably, the apparatus may comprise a digital data compression device in which a plurality of digital filters analyze the input signal over a plurality of frequency regions and a digital control logic generates a variable memory clock to clock sampled input data sampled at a constant rate into the memory at the variable clock rate corresponding to the highest frequency content of the input signal.

Prior devices analyze only the amplitude or change in amplitude of an input signal for data compression purposes, and perform the analysis in the analog domain. This technique limits the amount of data compression that can be achieved and is subject to errors due to, for example, voltage drifts of the analog components. With the present invention, the more comprehensive information, i.e., the frequency content of the signal, is analyzed and the analysis is performed in the digital domain. This will maximize data compression over prior devices and avoid errors due to, for example, voltage drifts.

BRIEF DESCRIPTION OF THE DRAWINGS

The accompanying drawings, which are incorporated in and form a part of the specification, illustrate an embodiment of the present invention and together with the description, serve to explain the principles of the invention. In the drawings:

FIG. 1A shows a waveform of a typical analog signal;

FIG. 1B is a waveform of the analog signal of FIG. 1A after being sampled at a constant rate and being digitized;

FIG. 1C is a waveform of the compressed digital data of FIG. 1B to be stored in memory;

FIG. 2 is a block diagram of an embodiment of the present invention;

FIG. 3 is a Bode plot of amplitude versus frequency used to explain the present invention;

FIG. 5 is a truth table used to explain the present invention;

FIG. 6 is another truth table used to explain the present invention;

FIG. 7 is a block diagram of a digital filter used in the embodiment of FIG. 2.

DETAILED DESCRIPTION

Figure 4:
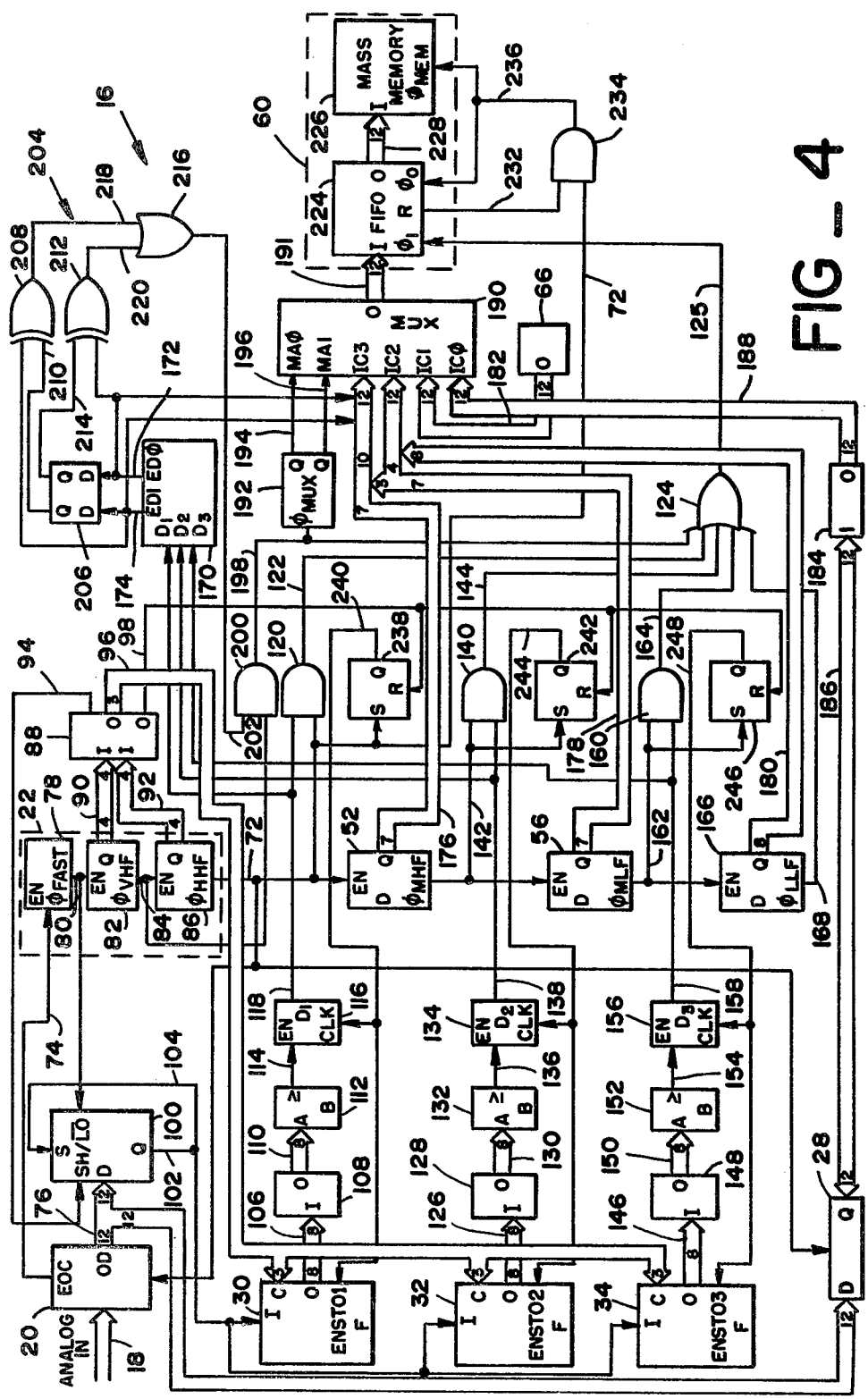
FIG. 4 is a schematic illustration of the embodiment of FIG. 2.

Reference will now be made in detail to the present preferred embodiment of the invention, an example of which is illustrated in the accompanying drawings.

The invention will be discussed in terms of storing non-redundant information in memory. However, it will be appreciated that the principles of the invention can be applied to transmitting non-redundant data in a data transmission system which is bandwidth limited.

FIG. 1A illustrates a typical analog signal 10 having variable frequency content. This signal 10 is assumed to have large amounts of redundancy such that a large portion of the signal 10 need not be stored, and yet the entire signal can be reconstructed without substantial loss of information. For example, the signal 10 may be a seismic signal whose frequency content varies slowly in time and over a wide frequency range.

As shown in FIG. 1B, the analog signal 10 can be converted to a signal or stream of digital data words 12 by sampling the signal 10 at a uniform or constant rate and encoding the amplitude of the samples. Each dot of the stream 12 represents a digital data word of, for example, 12 bits, giving information as to the amplitude of the sampled analog signal 10.

In accordance with the present invention, not all of the digital data words of the stream 12 shown in FIG. 1B need be stored. Rather, only a number of the data words of FIG. 1B are stored and these are indicated by the signal 14 of FIG. 1C. As can be seen by comparing FIG. 1B and FIG. 1C, data compression is achieved in that a fewer number of data words are stored, and yet this is sufficient to reconstruct the analog signal 10 without substantial loss of information.

FIG. 2 shows a block diagram of a data compression apparatus or device 16 in which the wide lines indicate a data bus or data flow lines and the narrow lines indicate control signal lines. The analog signal 10 of FIG. 1A is fed over a bus 18 to an analog to digital (A/D) converter 20 which also receives sampling pulses at a uniform or constant rate from a clock 22 over a line 24. Thus, the A/D converter 20 samples the analog signal 10 at a constant sampling rate provided by the clock pulses on line 24 and converts the signal 10 to the stream of data words 12 of FIG. 1B. An output bus 26 from the A/D converter 20 sends each data word of the stream 12 simultaneously to the inputs of a shift register delay 28, a digital filter 30, a digital filter 32 and a digital filter 34. The A/D converter 20 and filters 30, 32, 34 are one example of a means for analyzing the frequency content of the signal 10 in the digital domain, as will be further discussed.

The digital filters 30, 32, 34 act as a four-channel spectrum or frequency analyzer for making power measurements of the stream 12 in each channel. As an example and as shown in FIG. 3, filter 30 analyzes the frequency content of the stream 12 in a frequency region 1 between 50 KHz and 5 KHz. Filter 32 analyzes the frequency content of the stream 12 in a frequency region 2 between 5 KHz and 0.5 KHz. Filter 34 analyzes the frequency content of the signal 12 in a frequency region 3 between 0.5 KHz and 0.05 KHz. Also shown is a frequency region 4, called a default region, for analyzing the frequency content of the stream 12 in the region less than 0.05 KHz. The vertical arrows shown in FIG. 3 at the upper and lower boundaries of each region 1-4 represent idealized filter cut-off frequencies; however, the slanted lines indicate the overlap of one region into another that may occur in practice.

Means are provided for effectively sampling the input signal 10 for data compression purposes at a rate which is a function of the frequency content of the signal 10, i.e., not at a constant rate such as is used for the A/D converter 20. Preferably, such means includes a control logic 36 which communicates with the filter 30 over a line 38 and a line 40. The control logic 36 also communicates with the filter 32 over a line 42 and a line 44, and with the filter 34 over a line 46 and a line 48. The details of this communication will be described in connection with FIG. 4.

The clock 22 also produces clock pulses over a line 50 of a relatively high clock rate. A divider 52 divides the pulses on line 50 to produce a lower clock pulse rate on a line 54. A divider 56 divides the clock pulses on line 54 to produce a still lower clock pulse rate on a line 58.

Means are provided for storing the signal 10 being effectively sampled by the control logic 36. Preferably, such means includes a memory 60 that serially receives digital data words of the stream 12 from the output of the shift register delay 28 over a bus 62. The data words on bus 62 are clocked into the memory 60 at a variable clock rate which is determined by the control logic 36 and produced on a line 64. This clock rate on line 64 is a function of the frequency content of the signal 10 as analyzed by the filters 30, 32, 34. The data words stored in the memory 60 are the compressed data words shown in FIG. 1C. The delay of register 28 provides time for the spectral analysis to be performed on the data words of stream 12 by the filters 30, 32, 34 and for the proper memory clock rate to be determined by control logic 36 before the corresponding data words appear at the input of memory 60.

In operation, the analog signal 10 is fed to the A/D converter 20 and sampled at a constant rate of 100 KHz by the clock pulses on line 24. This 100 KHz sampling rate results from the example of FIG. 3 in which the highest frequency content of signal 10 is assumed to be 50 KHz. The converted signal or stream of data words 12 is then fed over bus 26 to the shift register delay 28 and the three filters 30, 32, 34. Under control of logic 36, each filter 30-34 then analyzes the frequency content of the stream 12 to determine if the signal 12 has frequency components, i.e., signal power, in respective regions 1-3. The control logic 36 then selects a particular clock rate from the line 50 or line 54 or line 58 and produces the selected rate on line 64 to clock the data words on bus 62 into the memory 60. If the stream 12 has frequency components or signal power only in default region 4, the control logic 36 produces a default clock rate on line 64 to clock the data words into memory 60.

Signal power in a higher frequency region will override signal power in a lower frequency region in selecting the clock rate on line 64. That is, if the stream 12 has power in the frequency region 1, then the control logic 36 will select the higher clock rate on line 50. If the stream 12 has power in lower region 2 and no power in higher region 1, then the control logic 36 will select the lower clock rate on line 54. If the stream 12 has power in the lower region 3, and no power in the higher region 1 or region 2, then the control logic 36 will select the still lower clock rate on line 58. If the stream 12 has no power in the region 1 or region 2 or region 3, then the default clock rate will be produced by the control logic 36. The default clock rate is produced by control logic 36 until higher frequency components in the stream 12 raise the power level to a higher region 1-3 for memory 5 clocking at a higher rate. Thus, while the analog signal 10 will be sampled at a constant rate by the clock on line 24, the signal 10 will be effectively sampled at varying rates with the clock rate on line 64 depending on the frequency content of the signal. The higher the frequency content, the higher the effective sampling rate.

In addition to the data words of signal 14 that are stored in memory 60, the control logic 36 produces two data words on a bus 65 that are stored in memory 60. These two data words indicate, respectively, the clock rate at which a data word of the signal 14 is stored in memory 60 and the real time from a previous default sample time at which a data word of signal 14 was stored. These two data words are used to reconstruct the original signal 10 from the data words of signal 14 stored in memory 60.

In order to distinguish the two data words on line 65 stored in memory 60 from the data words of signal 14, the data compression device 16 includes a code generator 66 that responds to a signal from the control logic 36 over a line 68 by providing a unique code word on a bus 70. This unique code word from the generator 66 is stored in memory 60 with each of the two data words on bus 65 as a flag to indicate that these two data words are not the data words of the signal 14, but are the data words produced by control logic 36 for reconstruction purposes.

FIG. 4 is a schematic illustration of the data compression device 16. The basic blocks shown in FIG. 2 are illustrated with the same reference numerals in FIG. 4, except for the control logic 36. The control logic 36 is comprised of the remaining components shown in FIG. 4 other than those given such same reference numerals. Also, a slight variation in the numbering of the data busses and control signal lines of FIG. 2 is used in FIG. 4 to explain the latter more easily. Still further, in accordance with conventional logic design notation, the wider lines in FIG. 4 having the small numbers are data busses having a number of data lines corresponding to the number shown in the respective busses. It will become apparent that FIG. 2 is presented in part to provide clearer support for the broader claims of this invention while FIG. 4 more clearly supports the narrower claims.

The A/D converter 20 receives the analog signal 10 on the bus 18 and converts this signal to the signal or stream of data words 12, each of 12 bit length. This conversion occurs continuously at a constant sampling rate in response to the clock rate produced by the clock 22 on a line 72. This clock rate on line 72, as will be shown, is the maximum clock rate for memory 60 and is the same clock rate as on lines 24 and 50 of FIG. 2. The converter 20 supplies an end-of-convert (EOC) signal on a line 74 at the end of each conversion at which time a 12-bit data word of stream 12 is supplied on an output bus 76. The time between two signals EOC is a sample period.

The clock 22 includes a fast clock 78 that is phase-locked with each EOC signal on line 74 and which produces fast clock pulses on an output line 80. The fast clock 78 will cycle a minimum of 32 times a sample period, i.e., between EOC signals on line 74. A divide-by-eight counter 82 divides the fast clock pulses on line 80 to produce output clock pulses on an output line 84. A divide by four counter 86 divides the output clock pulses on line 84 to generate the clock pulses on line 72 which are the sampling pulses for converter 20.

A state decoder 88 decodes the states of the counter 82 and counter 86 over a respective bus 90 and bus 92. The decoder 88 responds to the states of the counter 82 and 86 by generating timing signals on an output line 94, a bus 96 and an output line 98 for control purposes as will be described below.

A parallel-to-serial shift register 100 is loaded with a 12-bit data word on the bus 76 at the time of an EOC signal on line 74 in response to the timing signal on line 94. The 12-bit data word loaded into the register 100 is also loaded into the delay register 28 which is 12 bits wide by 32 words long. Data words are shifted into and out of the shift register 28 at the clock rate on line 72. During a next sampling period for the converter 20, the data word loaded into the register 100 is serially shifted out of the register 100 by the fast clock pulses on line 80 to the filter 30, the filter 32 and the filter 34 over an output line 102. This data word is also recirculated through the shift register 100 via a line 104 after a delay corresponding to three fast clock pulses on line 80. The data word thus is shifted out and recirculated at the fast clock rate on line 80 and makes at least two full passes through the shift register 100 between consecutive EOC signals on line 74. The reason for these two passes will be discussed in relation to FIG. 7 which shows details of digital filter 30.

The filter 30 receives the data words on line 102 to produce filtered 8-bit digital data on a data bus 106. This data on bus 106 provides information of the amplitude of any high frequency components of the signal 10 in the corresponding frequency region 1. A digital rectifier 108 rectifies the output of the filter 30 on bus 106 into unipolar form to produce output digital data words on a bus 110 of the absolute amplitude of the high frequency components of the stream 12 in region 1.

A digital comparator 112 compares each data word on bus 110, termed a frequency rectified word (FRW), with a fixed value amplitude threshold word (ATW) stored in the comparator 112. The output of the comparator 112 on a line 114 is true or logic 1 when a data word FRW on bus 110 has an amplitude greater than or equal to the ATW; otherwise the output is logic 0. Thus, the output from the comparator 112 will be true when the analog signal 10 contains frequency components within region 1 and these components have amplitudes greater than the ATW.

An up/down 8-bit counter 116 is controlled by the output of the comparator 112 on the line 114 and performs the function of a low pass digital filter. The counter 116 has a two-state decision output on a line 118 which is a logic 1 for the yes-state and a logic 0 for the no-state. If the state of line 118 is yes, this means that the data words loaded into the register 28 should be clocked into memory 60 at the memory clock rate for frequency region 1.

At start-up, the counter 116 will default to the no-state. In this no-state, a logic 1 output from the comparator 112 on line 114 will enable the counter 116 to count up, whereas a logic 0 output from the comparator 112 will reset the counter 116 to zero. Eight consecutive logic 1 outputs from the comparator 112 are required to trigger the counter 116 into the yes-state, i.e., to produce a logic 1 on line 118. Thus, eight consecutive data words received by the filter 30 must be in the region 1 and have an amplitude greater than the threshold word ATW of comparator 112 to produce the yes-state on line 118. This prevents noise spikes from triggering the counter 116 into the yes-state, resulting in an unwanted higher memory clock rate.

When the counter 116 is in the yes-state, a logic 0 output from the comparator 112 on line 114 allows the counter 116 to count down. The output on line 114 must remain logic 0 for 32 consecutive data words or sample periods before the counter 116 switches to the no-state. While the counter 116 is in the yes-state and is counting down, a logic 1 on line 114 occurring during one of the 32 sample periods will reset the counter 116 to its maximum count.

As will become apparent, this count down before change of state decreases the frequency at which the data compression device 16 changes the memory clock rate. A certain amount of oversampling will result since the device 16 will be effectively sampling the signal 10 at the highest memory clock rate, though during count down there is no signal power in region 1. However, this produces a smoothing effect on effective sampling rate changes, which is advantageous to overall data compression and signal reconstruction.

An AND gate 120 has one input connected to the line 118 and another input connected to the line 72. The output of the AND gate 120 on a line 122 is coupled as one input to an OR gate 124. Thus, when gate 120 is enabled by the logic 1 output on line 118, high-rate clock pulses on line 72 will be gated by the gate 120 to the OR gate 124 and onto an output line 125 of gate 124.

In a similar manner, the digital filter 32 receives the stream of data words 12 from the register 100 over the line 102 and outputs data words over a bus 126. A digital rectifier 128 rectifies the data words on bus 126 into unipolar form and produces rectified data words on an output bus 130. Each data word, i.e., FRW, on bus 130 is compared in a digital comparator 132 with a fixed value amplitude threshold word (ATW). An up/down 8-bit counter 134 is controlled by the output of the comparator 132 on a line 136 and has two states, i.e., a yes-state and a no-state, as for counter 116.

Counter 134 performs the same function as counter 116, but the number of sample periods or data words required to change its state is different. At start-up the counter 134 defaults to the no-state. In this no-state, only one logic 1 output on the line 136 from comparator 132 triggers counter 134 into the yes-state to produce a logic 1 on an output line 138. When counter 134 is in the yes-state, 16 sample periods of logic 0 on the line 136 may be used to switch counter 134 to the no-state and produce a logic 0 on line 138.

An AND gate 140 has one input connected to the line 138 and another input connected to the output of the divider 52 over a line 142. The output of the gate 140 on a line 144 is coupled as another input to the OR gate 124. Thus, when counter 134 is in the yes-state, gate 140 will be enabled to gate the clock pulses on line 142 to the output line 125 via OR gate 124. The clock rate on line 142 is lower than the clock rate on line 72.

In another similar manner, the filter 34 receives the stream of data words 12 from the register 100 on the line 102 and outputs 8-bit data words on a bus 146. A digital rectifier 148 rectifies the data words on bus 146 to produce rectified data words, i.e., FRWs on output bus 150. A comparator 152 compares the amplitude of each data word on the bus 150 to a fixed value amplitude threshold word (ATW) to produce a logic 1 on a line 154 each time an FRW is greater than or equals the ATW. An 8-bit, two-state counter 156 is controlled by the comparator output on line 154 and performs the same function as counter 134 and counter 116, though the number of sample periods before a change of state can occur is different. Counter 156 can have a yes-state or logic 1 output on a line 158 or a no-state or logic 0 on the line 158.

At start-up, the counter 156 will default to the no-state. Thereafter, only one logic 1 output on the line 154 is required to trigger the counter 156 to the yes-state. However, while in the yes-state, the output on line 154 may be logic 0 for 8 sample periods before the counter 156 is switched to the no state.

An AND gate 160 has one input connected to the line 158 and another input connected to a line 162 carrying the clock pulses from divider 56. The output of gate 160 is produced on a line 164 as another input to the OR gate 124. Consequently, when counter 156 is in the yes-state, so that a logic 1 is on the line 158, the gate 160 is enabled to gate the clock pulses on line 162 onto line 125 via gate 124. The clock rate on line 162 is lower than the clock rate on line 142.

A divider 166 receives the clock pulses on line 162 from the divider 56 and produces a slow clock rate of pulses on an output line 168. The OR gate 124 has another input connected to the line 168. The clock rate on line 168 is the default rate for effectively sampling the analog signal 10 when its frequency components are only in the default region 4.

As already indicated and as will be described further, the memory clock rate at which each data word of signal 14 is stored in memory 60 also should be stored to reconstruct the analog signal 10. A 4-level to 2-bit encoder 170 has three inputs $D_1$-$D_3$ connected, respectively, to line 118, line 138 and line 158. These inputs represent the state of the respective counters 116, 134 and 156. Encoder 170 produces a 2-bit output ED$\phi$ and ED1 on respective lines 172 and 174 to encode the four possible memory clock rates for regions 1-4. The truth table for the encoder 170 is given in FIG. 5. Thus, for example, if counter 116 is in the true state indicating that the analog signal 10 has signal power in region 1, the 2-bit output on lines 172 and 174 will be 1 1, which is a data word identifying the highest memory clock rate and which will be stored in memory 60. The truth table of FIG. 5 shows "don't cares" for this condition because, as already indicated, if there is signal power in region 1, the signal 10 should be effectively sampled by the highest memory clock rate.

As also already indicated, another data word that should be stored in the memory 60 to reconstruct the analog signal 10 is a word that gives the real time from the preceding default sample time. Consequently, FIG. 4 shows a data bus 176, a data bus 178 and a data bus 180, each connected to the respective divider 52, 56 and 166. As each divider 52, 56 and 166 counts pulses, the count in these dividers will represent the real time from the previous default sample time and this information will be given by a 22-bit data word on the three busses 176, 178 and 180.

Thus, a 24-bit data word is generated by the data compression device 16, in which 2 bits identify the memory clock rate and 22 bits identify the real time from the preceding default sample time. In order to flag this 24-bit data word, the unique code word generator 66 shown in FIG. 2 and FIG. 4 generates a unique 12-bit code word on a bus 182. This unique code word is, for example, 12 bits of all 1's.

As already indicated, the stream of data words 12 on the bus 76 from the A/D converter 20 is fed to the delay register 28, as shown in FIG. 4. A code converter 184 is connected to the output of the register 28 over a bus 186 and produces outputs on a bus 188. The converter 184 tests the 11 most significant bits of each data word from the register 28 and, only if they are all logic 1's, forces the 12th or least significant bit to a logic 0. This is done to make use of the unique code word of all 1's from the generator 66 as the flag word. Otherwise, the converter 184 outputs the data words exactly as received.

A multiplexer 190 has four input ports IC$\phi$, IC1, IC2 and IC3 coupled to the buses 176, 178, 180, 182 and 188, as shown, and has an output bus 191. The lines 172, 174 carrying the memory clock rate data are coupled to the bus 176. A multiplexer address counter 192 generates a 2-bit sequential address MA$\phi$, MA1 over lines 194, 196 to cause the multiplexer 190 to sequentially select the input ports IC$\phi$-IC3. Port sequencing is indicated by the truth table of FIG. 6. Thus, first the port IC$\phi$ is selected to receive a data word on bus 188, then port IC1 is selected to receive the unique code word on bus 182, then port IC2 is selected to receive the 12 most significant bits of the 22-bit memory clock rate real time change word, and then IC3 is selected to receive the 10 least significant bits of the change word and the 2 bits of the memory clock rate word.

Address counter 192 is clocked by pulses on a line 198 coupled to the output of an AND gate 200. One input to the gate 200 is the clock pulses on the line 84 from the counter 82 and the other input to the gate 200 is an enabling pulse on an input line 202. The enabling pulse on line 202 is generated each time there is a change in memory clock rate.

A change of memory clock rate detector means that produces the enabling pulse on line 202 is shown generally at 204. Preferably such means includes a 2-bit latch 206 that has two inputs connected, respectively, to the lines 172 and 174 from the encoder 170. An exclusive-OR gate 208 has one input connected to one output of the latch 206 over a line 210 and another input coupled to the line 174. An exclusive-OR gate 208 has one input connected to one output of the latch 206 over a line 210 and another input coupled to the line 174. An exclusive-OR gate 212 has one input connected to the other output of the latch 206 over a line 214 and another input coupled to the line 172 from the encoder 170. An OR gate 216 has one input connected to the output of gate 208 over a line 218 and another input connected to the output of the gate 212 over a line 220. The output of gate 216 is the enabling pulse on line 202.

In the operation of circuit 204, assume that during one sampling period of A/D converter 20 the memory 60 is being clocked at the highest rate, i.e., for region 1, so that the outputs ED$\phi$, ED1 on lines 172, 174 are presently stored in the latch 206 as 1 1. Assume also that for the next sampling period the memory 60 is being clocked at the same rate so that again outputs ED$\phi$, ED1 are 1 1. Consequently, at this next sampling period, the two inputs to gate 208 will be 1 1 as will the two inputs to gate 212. Therefore, the 2-bit output of gate 208 and 212 will be 0 0, whereby a logic 0 will be produced on the line 202 to disable the gate 200 corresponding to no change in memory clock rate.

Assume now that the next sampling period results in a change in the memory clock rate, for example, to the lower rate for region 2. Encoder 170 will thereby produce a 2-bit output 10 for this sampling period on lines 174, 172 respectively. Therefore, at this time, gate 208 will have at its two inputs the 2-bit input 1 1 resulting in a 0 on line 218. Gate 212 will have a 2-bit input 10 resulting in a 1 on line 220. Consequently, the output of gate 216 is now a 1, indicating a change in the memory clock rate, and gate 200 will be enabled. Thus, when the change in memory clock rate occurs, gate 200 is enabled to clock the address counter 192 at the clock rate on line 84.

As long as there is no change in memory clock rate, the gate 200 will be disabled and the address counter 192 will default to the 0 0 output state. Consequently, the port IC$\phi$ of the multiplexer 190 will be selected to couple the data words on bus 188 to the output bus 191.

The memory 60 includes a first in, first out buffer memory 224 and a mass memory 226. The buffer memory has its input connected to the bus 191 and an output connected over a bus 228 to the input of the mass memory 226. The data words on bus 191 are clocked into the buffer memory 224 at the clock rate of the pulses produced on the line 125 connected to the output of the OR gate 124. When the buffer memory 224 has data words and is ready to output these words, a ready pulse is produced on a line 232 to enable an AND gate 234 whose other input is the clock pulses on line 72 from the counter 86. The output of gate 234 is produced on a line 236 which is coupled to the output clock port of the buffer memory 224 and the input clock port of the memory 226. Thus, data words are clocked out of the buffer memory 224 and clocked into the mass memory 226 at a constant clock rate corresponding to the clock rate on line 72.

FIG. 4 also shows a flip-flop 238 having a reset input R connected to the line 98 from the decoder 88, a set input S connected to the line 72 from the counter 86 and an output Q connected to a line 240 leading to a control input (ENSTO 1) of digital filter 30 and the clock input of the counter 116. Another flip-flop 242 has a reset input R connected to line 98, a set input S connected to the line 142 from the divider 52 and an output Q connected to a line 244 coupled to a control input (ENSTO 2) of the filter 32 and the clock input of the counter 134. Yet another flip-flop 246 has its reset input R connected to the line 98, a set input S connected to the line 162 from the divider 56 and an output Q coupled to a line 248 leading to the control input (ENSTO 3) of the filter 34 and the clock input of the counter 156. The control produced by the flip-flops 238, 242 and 246 will be discussed in more detail in connection with FIG. 7.

The digital filter 30 is shown in more detail in FIG. 7. Filter 30 includes an adder 238 that logically adds, bit-by-bit, each 12-bit data word on line 102 to a data word on a line 240 to produce an output data word on a line 242 that is clocked into a serial register 244. An adder 246 similarly logically adds the data word on line 102 to the data word received on a line 248 from register 244. The resulting 12-bit data word from adder 246 is shifted into a 12-bit parallel register 250 over a line 252. The 12-bit data word in register 250 is shifted out onto bus 106 and past the most significant bit stage of register 250 onto a line 254 which is coupled to the Y input of a multiplier 256 for reasons which will be described. Multiplier 256 also has an X input at which a 12-bit filter cut-off coefficient word is stored for filter 30.

In the operation of filter 30, when the signal ENSTO1 on line 240 is true, data stored in register 244 is serially subtracted from the first pass serial data from register 100 of FIG. 4 on line 102. The resulting 12-bit difference word on line 252 is clocked into register 250. This difference word also is serially shifted onto line 254. Multiplier 256 multiplies the 12-bit difference word received via the Y input from line 254 and the 12-bit filter cut-off coefficient word at input X, which results in a 24-bit result and which means that multiplier 256 must be clocked 24 times. However, register 250 is only 12 bits long, so that during the last 12 multiplication cycles the output data word from register 250 is frozen and only a sign bit of this word is made available to multiplier 256 on line 254. At this same time, i.e., the last 12 multiplication cycles, the data word emerging from the serial output of multiplier 256 on line 240 is substracted from the second pass serial data out of register 100. The resulting 12-bit difference word is stored in register 244 to be made available later for the next sampling period. Filter 32 and filter 24 are similarly constructed and operate similarly as filter 30.

In the overall operation of the data compression device 16 of FIG. 4, the analog input signal 10 is converted each sampling period to a digital data word whereby the stream of data words 12 on the bus 76 is produced. The sampling by converter 20 occurs at the constant rate provided by the clock, on the line 72, which is the maximum memory clock rate. Each data word on bus 76 is shifted into the shift register 100 and then shifted out to the digital filters 30, 32 and 34. Simultaneously, each data word on the bus 76 is shifted into the delay register 28.

Assume that the analog signal 10 has frequency components in region 1. Also assume that the power of the signal in region 1 exists for the required sampling periods so that during one sampling period counter 116 is switched into the yes-state.

Consequently, the AND gate 120 will be enabled to gate clock pulses from counter 86 to the OR gate 124, thereby producing a memory clock rate on line 125 for effectively sampling the analog signal 10 at this rate.

Also, the switching of counter 116 into the yes-state constitutes a change in the sampling rate. This change of state will be detected by the circuit 204. Consequently, gate 200 will be enabled to clock address counter 192 and, thereby, cause multiplexer 190 to select the four ports IC$\phi$-IC3 in sequence. The data word for such one sampling period will be coupled out of register 28, through the code converter 184, onto the bus 188 and then onto the bus 191. Then, the unique code word from the code generator 66 on the bus 182 will be coupled to the bus 191. Thereafter, the 24-bit data word from the busses 180, 178, 176 and the lines 172, 174 will be coupled by the selected ports IC2 and IC3 onto the bus 191. Thus the data word for this one sampling period is clocked into the buffer memory 224 at the clock rate on line 125 corresponding to the clock rate on line 84, together with the unique code word and 24-bit data word identifying the memory clock rate and real time since a previous default sample time.

Assume that for the next sampling period the analog signal 10 still has frequency components in region 1. Consequently, gate 200 will be disabled since there will be no change in memory clock rate and address counter 192 will default to the 00 state, whereby multiplexer 190 will select only port IC$\phi$. As long as the analog signal 10 continues to have frequency components in region 1, only port IC$\phi$ will be selected to couple the data words on bus 188 to the bus 191 and these will be clocked into buffer memory 224 at the highest memory clock rate.

After a number of sampling periods, at which time a number of data words have been clocked into buffer memory 224 at the highest clock rate, the ready pulse on line 232 is generated to enable the gate 234. Therefore, the data words in buffer memory 224 will be clocked into the mass memory 226 at the constant clock rate on line 236.

Assume now that, for example, the analog signal 10 has frequency components only in region 3. After conversion by the converter 20 and shifting of the converted data words out of the register 100 to the filter 34, counter 156 will be switched during one sampling period to the yes-state to enable gate 160. Also, during this one sampling period, circuit 204 will detect a change in counter state to enable gate 200 and clock the address counter 192. Now, therefore, the clock rate on line 84 from the divider 82 will be produced on line 125 and the multiplexer 190 will be addressed to serially select the input ports IC$\phi$-IC3. Accordingly, in a similar manner as described above, the data word on bus 188 for this one sampling period for region 3, the unique code word on bus 182 and the 24-bit data word on busses 176, 178 and 180 will be coupled by the multiplexer 190 onto the bus 191 and be clocked into the buffer memory 224 at the clock rate on line 125 corresponding to the clock on line 84. Thereafter, assuming no change in counter state, circuit 204 will disable gate 200 and the following data words will be clocked into buffer memory 224 at the lower clock rate for region 3 from the divider 56 with address counter 192 being in the default state of 00. These data words corresponding to region 3 will be clocked into mass memory 226 at the constant clock rate on line 236.

As another example of the operation of data compression device 16, assume the signal 10 has no frequency components in the regions 1-3. The gates 120, 140 and 160 will be disabled and the clock pulses from divider 166 on line 168 will be gated through gate 124 to become the clock for memory 60 corresponding to the default region 4. Thereafter, should the signal 10 have frequency components in region 2, gate 140 will be enabled to automatically provide the higher clock rate on line 125 for memory 60.

In summary, the data compression device 16 analyzes the frequency content of an input signal to control the sampling rate for data compression purposes. This constitutes a more comprehensive analysis of the input signal for increasing data compression over prior devices which use the amplitude or slope techniques previously discussed. In other words, more redundant data can be determined and eliminated from storage or transmission with the present invention than with the prior devices. Also, the use of a variable rate memory clocking of the memory 60 as a means of varying the effective sampling rate of the input signal is unique and relatively simple. Furthermore, the data compression device 10, being digital, is more accurate than prior analog devices which are subject to errors due to, for example, well-known factors such as drift.

The foregoing description of a preferred embodiment of the invention has been presented for purposes of illustration and description. It is not intended to be exhaustive or to limit the invention to be precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An adaptive digital data compression device for compressing an analog data input signal having variable frequency content, comprising:
  (a) an analog-to-digital converter for converting the analog signal to a stream of first digital data words at a constant sampling rate;
  (b) a plurality of digital filters each for detecting the frequency content of the stream of first digital data words over respective frequency regions;
  (c) a plurality of means, each connected to one of said digital filter, for generating an enabling pulse in response to detecting a preset number of the first digital data words in a respective frequency region;
  (d) means for generating a plurality of clock signals each having a rate corresponding to one of the frequency regions;
  (e) gating means for selecting one of the clock signals corresponding to a higher frequency region in response to the corresponding enabling pulse to produce a variable rate clock;
  (f) means for generating second digital data words having information of a change in the rate of the variable rate clock;
  (g) means for generating third digital data words having information of the real time from the change in rate of the variable rate clock;
  (h) a first in, first out buffer memory;
  (i) a mass memory;
  (j) means for clocking the first digital data words into said buffer memory at the rate of the variable rate clock and for clocking the second digital words and the third digital data words into said buffer memory; and
  (k) means for clocking the first digital data words, the second digital data words and the third digital data words out of said buffer memory and into said mass memory at the constant sampling rate.

2. An adaptive digital data compression device according to claim 1 wherein said plurality of means for generating an enabling pulse each comprises:
  (a) a comparator having a preset amplitude threshold for comparing the power of the frequency content of the first digital data words to the amplitude threshold; and
  (b) an up/down counter, connected to said comparator, for counting up a predetermined number of first digital data words exceeding the amplitude threshold before the enabling pulse is generated, and for counting down a predetermined number before the enabling pulse is not generated.

* * * * *